(12) United States Patent
Holm et al.

(10) Patent No.: US 8,453,595 B2
(45) Date of Patent: Jun. 4, 2013

(54) JETTING APPARATUS AND METHOD OF IMPROVING THE PERFORMANCE OF A JETTING APPARATUS

(75) Inventors: William Holm, Älvsjö (SE); Håkan Sandell, Täby (SE); Johan Kronstedt, Sollentuna (SE)

(73) Assignee: Mydata Automation AB, Bromma (SE)

( * ) Notice: Subject to any disclaimer, the term of this patent is extended or adjusted under 35 U.S.C. 154(b) by 1056 days.

(21) Appl. No.: 12/084,964

(22) PCT Filed: Nov. 14, 2006

(86) PCT No.: PCT/EP2006/010921
§ 371 (c)(1),
(2), (4) Date: Mar. 15, 2009

(87) PCT Pub. No.: WO2007/054371
PCT Pub. Date: May 18, 2007

(65) Prior Publication Data
US 2009/0266906 A1    Oct. 29, 2009

Related U.S. Application Data

(60) Provisional application No. 60/735,898, filed on Nov. 14, 2005.

(51) Int. Cl.
*B05C 5/02* (2006.01)
(52) U.S. Cl.
USPC ............... 118/300; 118/712; 347/6; 347/7; 347/30; 347/93; 239/112; 239/113

(58) Field of Classification Search
USPC ...... 118/300, 712, 302, 603, 610, 50; 347/30, 347/93, 67, 6, 7; 239/112, 113; 222/108–111; 228/33
See application file for complete search history.

(56) References Cited

U.S. PATENT DOCUMENTS

| | | | |
|---|---|---|---|
| 4,934,309 A * | 6/1990 | Ledermann et al. | 118/50 |
| 5,725,664 A * | 3/1998 | Nanbu et al. | 118/52 |
| 5,908,990 A | 6/1999 | Cummings | |
| 6,450,416 B1 | 9/2002 | Berg et al. | |

(Continued)

FOREIGN PATENT DOCUMENTS

| | | |
|---|---|---|
| JP | 57-184462 A | 11/1982 |
| JP | 6-258189 A | 9/1994 |
| WO | WO-2005/048678 A | 5/2005 |

*Primary Examiner* — Laura Edwards
(74) *Attorney, Agent, or Firm* — Birch, Stewart, Kolasch & Birch, LLP (57) ABSTRACT

A jetting apparatus for jetting droplets of viscous medium onto a substrate and a method of improving the performance of the jetting apparatus are provided. The jetting apparatus includes a jetting outlet through which the droplets are jetted, a flow generator for producing a flow of air past the jetting outlet for removing viscous medium residue at the jetting outlet, a receptacle for receiving viscous medium residue transported by the air flow away from the jetting outlet, and a flow path for the air flow between the jetting outlet and the flow generator, via the receptacle. A flow sensor is arranged in the flow path for measuring the air flow. An air flow signal representative of the air flow is obtained, the air flow signal is evaluated for determining at least one status of the jetting apparatus, and an indication of the status is provided.

18 Claims, 7 Drawing Sheets

U.S. PATENT DOCUMENTS

| | | |
|---|---|---|
| 6,654,697 B1 | 11/2003 | Eryurek et al. |
| 7,182,420 B2 * | 2/2007 | Nakazawa .................. 347/7 |
| 2002/0014602 A1 | 2/2002 | Holm et al. |
| 2002/0015780 A1 | 2/2002 | Holm et al. |
| 2002/0043570 A1 | 4/2002 | Holm et al. |
| 2002/0047052 A1 | 4/2002 | Holm et al. |
| 2004/0089733 A1 | 5/2004 | Nissinen |
| 2004/0118935 A1 | 6/2004 | Holm et al. |
| 2004/0217193 A1 | 11/2004 | Holm et al. |
| 2004/0262824 A1 | 12/2004 | Andersson et al. |
| 2005/0092774 A1 | 5/2005 | Holm et al. |
| 2005/0167519 A1 | 8/2005 | Holm et al. |
| 2007/0076183 A1 * | 4/2007 | Hara et al. .................. 355/53 |

* cited by examiner

JETTING APPARATUS AND METHOD OF IMPROVING THE PERFORMANCE OF A JETTING APPARATUS

TECHNICAL FIELD

The present invention relates to the field of jetting deposits of viscous medium onto substrates. More particularly, the invention relates to a method of improving the performance of a jetting apparatus for jetting droplets of viscous medium onto a substrate, as well as such a jetting apparatus.

TECHNICAL BACKGROUND

Systems, devices and methods for controlled jetting of individual droplets of viscous medium, e.g. solder paste or glue, onto a substrate, e.g. an electronic circuit board, are known in the art. See for instance patent publications U.S. Pat. No. 6,450,416; US 2002/0043570; US 2002/0047052; US 2002/0014602; US 2002/0015780; US 2004/0118935; US 2004/0262824; US 2005/0092774; US 2005/0167519; and WO 2005/048678, which are all incorporated herein by reference.

In the MY500 Jet Printer provided by Mydata automation AB, a system for jetting viscous medium comprises a jet printing machine, a solder paste tube for containing solder paste to be jetted, a residue receptacle for holding residue and surplus of solder paste resulting from the jetting process, an ejector element for performing the actual jetting of the solder paste, and a holder matable with the jet printing machine. The holder, jetting element, residue container, and solder paste tube are arranged to be assembled away from the jet printing machine, and to form an individual, aggregate unit which may be readily positioned in a matable holding elements provided in the jet printing machine. The ejector comprises a feeder in the form of a feed screw, which is powered by a stepper motor arranged in the holder matable via interface of the stepper motor and the ejector.

In US 2004/0217193, also incorporated herein by reference, there is disclosed a jetting device and a method for improving the performance of the jetting device. The jetting device comprises a jetting outlet through which droplets are jetted, and gaseous flow is provided past the jetting outlet such that an adverse effect on the performance of the jetting device is prevented, the adverse effect resulting from the accumulation of viscous medium residue at the jetting outlet. In other words, the provision of a gaseous flow past the jetting outlet results in a transportation away from the jetting outlet of viscous medium residue that otherwise might adhere to the walls of an outlet nozzle, and cause detrimental viscous medium build-up that may have a negative impact on the overall jetting performance.

Even though the jetting apparatus disclosed in US 2004/0217193 represents a significant improvement in relation to prior jetting apparatuses, a variation in the quality or performance of the jetting process over time has been found. Therefore, a need exists for even further improving the jetting method and apparatus disclosed in US 2004/0217193.

SUMMARY OF THE INVENTION

Thus, the object of the present invention is to provide a method and apparatus that results in an improved jetting operation.

This and other objects are achieved according to the present invention by providing a method and an apparatus having the features defined in the independent claims. Preferred embodiments are defined in the dependent claims.

According to a first aspect there is provided a method of improving the performance of a jetting apparatus for jetting individual droplets of viscous medium onto a substrate, said jetting apparatus including a jetting outlet through which said droplets are jetted, a flow generator for producing a flow of air past the jetting outlet for removing viscous medium residue at the jetting outlet, a receptacle for receiving viscous medium residue transported by said air flow away from the jetting outlet, and a flow path for said air flow between said jetting outlet and said flow generator, via said receptacle. The method comprises the steps of measuring the air flow in said flow path and obtaining an air flow signal representative of said air flow, evaluating said air flow signal for determining at least one status of said jetting apparatus, and providing an indication of said status.

According to a second aspect there is provided a jetting apparatus for jetting droplets of viscous medium onto a substrate, including a jetting outlet through which said droplets are jetted, a flow generator for producing a flow of air past the jetting outlet for removing viscous medium residue at the jetting outlet, a receptacle for receiving viscous medium residue transported by said air flow away from the jetting outlet, and an air flow path for said air flow between said jetting outlet and said receptacle. The jetting apparatus further comprises an air flow meter for measuring the air flow in said air flow path, said air flow meter including a flow sensor positioned in the air flow path, said air flow meter being arranged for outputting an air flow signal representative of the air flow in the air flow path, and a processor arranged for receiving said flow signal from the air flow meter, evaluating said flow signal, and outputting an indication of a status of the jetting apparatus.

Thus, the invention is based on the advantageous insight of measuring the flow of air between the jetting outlet and the receptacle, and evaluating the flow measurement for obtaining a status of the jetting apparatus, such as filling ratio of the receptacle. Thereby, the filling ratio can be monitored in order to prevent overfilling of the receptacle and a resulting insufficient removal of viscous medium residues from the jetting outlet. Then, a decrease in the flow rate could be used for indicating the filling ratio of the receptacle. This enables a signal to be presented to the operator for signaling that the filling ratio of the receptacle has reached a threshold level and that the receptacle needs to be replaced, or enable a shutdown of the entire system when an indication of high risk for overfilling is provided as a result of monitoring the filling ratio. However, as will be described further below, the air flow measurements has surprisingly been found to provide an indicator of other jetting process characteristics, as will be described further below.

For the purposes of this application, it is to be noted that the term "viscous medium" should be interpreted as solder paste, flux, adhesive, conductive adhesive, or any other kind of medium used in connection with mounting components on a substrate, conductive ink, resistive paste, or the like; that the term "deposit" refers to a connected amount of viscous medium applied at a position on a substrate as a result of one or more. jetted droplets; and that the term "substrate" should be interpreted as a printed circuit board (PCB), a substrate for ball grid arrays (BGA), chip scale packages (CSP), quad flat packages (QFP), wafers, flip-chips, or the like.

It is also to be noted that the term "jetting" should be interpreted as a non-contact dispensing process that utilizes a fluid jet to form and shoot droplets of a viscous medium from a jet nozzle onto a substrate, as compared to a contact dispensing process, such as "fluid wetting".

In the following description, embodiments of jetting systems and methods will be described which comprise a jetting machine, viscous medium ejectors, viscous medium containers, residue receptacles, and holders. The term:

"ejector" refers to the element for actuating the actual jetting of viscous medium droplets;

"container" refers to the element in which viscous medium is stored before and supplied from during jetting and is in fluid communication with the ejector;

"receptacle" refers to a container for receiving and holding surplus or residue viscous medium, for instance surplus viscous medium transported from the outlet of the ejector by means of pressurized air; and "holder" refers to a holding frame having mechanical and electrical interface with the jetting machine and holds the ejector, container and receptacle, thus forming an aggregate unit or assembly in conjunction with the ejector, container and receptacle, which in the following description sometimes will be referred to as a "cassette"; and "jetting machine" refers to the framework into which the unit or assembly is mounted. The jetting machine comprises means for holding, positioning and providing trigger signals for the cassettes during the jetting operation, and also means for holding and transporting the substrates onto which viscous medium is to be applied. The jetting machine further comprises software and inspection means for controlling and monitoring the entire viscous medium application process. However, unless the interaction between the jetting machine and the other elements or the cassette is described, the term jetting machine or jetting apparatus will in the following often refer to the entire system, including the elements referred to above.

The ejector comprises a jetting nozzle, from where droplets of viscous medium may be jetted, a feeder, for feeding viscous medium towards the jetting nozzle, and an impactor, i.e. an impacting element for impacting viscous medium fed by the feeder such that droplets of viscous medium is ejected through the nozzle. Following an impact on the viscous medium, the impactor is preferably immediately returned to a position ready for impact, so as to not interfere with the feeding of viscous medium for the droplet to be subsequently jetted.

The jetting nozzle, in turn, comprises a nozzle outlet, also referred to herein as a jetting outlet, through which the droplets are jetted towards the substrate. The nozzle outlet is located at one end of the nozzle. Furthermore, the nozzle has surrounding inner walls defining a nozzle space in open communication with the nozzle outlet. During jetting operation of the ejector, the nozzle space is filled with viscous medium to a varying degree prior to the jetting of individual droplets, the degree preferably being adjustable in dependence on the desired volume of the droplet to be jetted.

The jetting apparatus further comprises residue receptacles for receiving and holding surplus and residual viscous medium, such as viscous medium residue removed from the nozzle or jetting outlet in order to avoid such residue from interfering with the jetting process and negatively affecting jetting accuracy. The viscous medium residue is removed from the nozzle by providing an air flow past the nozzle, via a flow path in the ejector housing, and into the receptacle. The receptacle comprises an inlet for receiving the viscous medium, the inlet suitably facing the area surrounding the nozzle outlet, a collection chamber for holding the viscous medium, and an outlet connected to an ejector or the like for generating the suction force providing the flow of air. Preferably, the receptacle also comprises a filter allowing the flow of air to pass through the receptacle, while preventing viscous medium from escaping the receptacle along with the air flow.

As mentioned above, an air flow is provided past the jetting outlet, the magnitude and the velocity of the air flow being sufficient for transporting viscous medium residue away from the area at the jetting outlet with the air flow. Thus, the often minute quantities of viscous medium that following the jetting of a droplet remains attached to surfaces at the jetting outlet, where no residue is desired, is loosened from said surface and carried away by the air flow. Also, the air flow provided past the jetting outlet may prevent certain quantities of viscous medium residue to attach to said surfaces in the first place.

The presence of viscous medium residue, and the possible accumulation thereof, at the jetting outlet may have a negative effect on the jetting performance for a number of reasons. For instance, it may have an adverse effect on the trajectory of the jetted droplets as they pass the jetting outlet, the viscous medium residue may interfere with the jetted droplet so as to alter the volume of the droplet, e.g. a volume of viscous medium residue situated at the jetting outlet may loosen from the surface and instead adhere to and be incorporated into the jetted droplet, the residue may cause spattering of viscous medium when a jetted droplet "collides" with the residue, etc. Consequently, the presence of viscous medium residue at the jetting outlet may cause deviations in the position, form or size of the resulting deposits compared to that intended. Also, there may be spatters of viscous medium on the substrate, which spatters may form solder balls that move around freely on the substrate during reflow and can, in turn, result in bridging, short circuits, and reduced reliability.

Thus, the accumulation or build-up of viscous medium residue has an undesired influence on the jetting performance and, consequently, on the overall performance of the jetting apparatus. Particularly, the undesired presence of viscous medium residue at the jetting outlet will impair the accuracy and the reproducibility of the apparatus, especially over a period of time, due to the random build-up of undesired material at the jetting outlet. It may also be the cause of undesired operator interventions, which bring about interruptions in the manufacturing process and thereby decreases the overall manufacturing speed.

A further advantage resulting from the provision of gaseous or air flow during the actual jetting of a droplet is that satellites of viscous medium can be picked-up and transported away from the vicinity of the jetting outlet. Such satellites are minute quantities of viscous medium that undesirably breaks away from the droplet or jet of viscous medium during jetting, thus forming a so called satellite. Satellites do normally have the same general direction as the droplet or jet, although with an angular deviation that causes the satellites to hit the substrate spaced apart from the intended deposit. These satellites can cause the formation of solder balls that move around freely on the substrate during reflow and can, as stated above, result in bridging, short circuits, etc. Thus, the prevention of viscous medium satellites improves the result of the application of viscous medium onto the substrate and, hence, decreases the rejection rate of the completed substrates.

According to embodiments of the invention, the jetting apparatus comprises an air flow meter for monitoring the air flow in the flow path between the nozzle outlet and the flow generator, via the receptacle. The air flow meter comprises a sensor which is positioned in or immediately at the air flow path. There are a number of readily available flow meters that may be used for measuring said air flow, such as a MEMS Mass Flow Sensor provided by Omron Electronic Components. In fact, any type of flow meter which has a size suitable for fitting in or at the flow path, and has a sufficient accuracy for the magnitude of air flow present in the flow path can be used. Of course, the flow magnitude may vary in dependence on other features of the jetting apparatus, such as droplet size and jetting frequency.

Preferably, the air flow meter is positioned outside of the receptacle and ejector, e.g. in the flow path between the receptacle and the flow generator. Thereby, the flow sensor may be essentially permanently arranged in the jetting machine, and still be able to measure the air flow in the flow path of the jetting assembly, i.e. of the receptacle and ejector. Thus, even though the measurement is performed outside of the jetting assembly, due to the air-tight interfaces between the jetting machine and the jetting assembly, the air flow will be the same in the flow path after the receptacle as in the flow path between the receptacle and the jetting outlet. However, other positions for the flow sensor are also contemplated within the scope of the present invention, such as in the flow path within the jetting assembly.

According to exemplifying embodiments, as stated above, the measurements of air flow are evaluated for determining the filling ratio of the receptacle. Alternatively, the clogging degree of the filter may be determined, which are two different causes resulting in the same problem. If the filling ratio of the receptacle is high, then a larger portion of the viscous medium residue will pass the collection chamber and end up in the filter, thereby increasing the clogging thereof. On the other hand, if the filter is getting clogged and the air flow thereby decrease, then the air flow will not have such a large carrying force on the viscous medium residue and a larger portion of the residue will stay in the chamber for holding the viscous medium, thereby increasing the filling rate of the collection chamber.

The determination of the filling ratio or clogging degree may be performed by comparing the measured air flow with selected threshold values. Then, a number of threshold values may be used, such as for distinguishing between an empty receptacle, i.e. a "new" or unused receptacle; a used receptacle; a receptacle with a limited remaining life, i.e. time or number of jetted droplets remaining until over-filling; and an over-filled receptacle. In the latter case, an indication to stop the jetting process may be provided to the operator for stopping the jetting process, or preferably to the jetting apparatus control system for automatically shutting down the jetting apparatus.

In addition or as an alternative to using threshold values which are compared to air flow values, the air flow measurements may be evaluated over time. Thus, instead of obtaining discrete air flow values for separate comparison with threshold values, the variation of the air flow is continuously or intermittently monitored. Thereby, the variation rate may be used as an indicator for distinguishing between different filling ratios or clogging degrees. For instance, when the filling ratio is getting close to over filling, the air flow decreases at a significantly higher rate. One reason is that the greater the filling degree of the chamber, the larger a portion of the viscous medium residue will be carried past the chamber and into the filter. Thus, the clogging rate will increase significantly, not to say dramatically, and the air flow decrease in corresponding manner.

It should in this context be noted that a reduction in the air flow does likely not only result from an increase of the filling rate of the chamber and/or the clogging rate of the filter. If the air flow becomes reduced, the probability of viscous medium residue build-up increases. Such build-up could be located at the jetting outlet, or at various locations in the air flow path, in particular where the air flow is guided to deflect into a new direction. This could lead to clogging of the air flow path, which could reduce the air flow and enhance the problems even further. Thus, by monitoring the air flow for detecting and determining filling ratio or filter clogging, a detection of clogging of other portions of the flow path is also obtained. Thus, if the air flow is maintained at a high level, clogging of the flow path and viscous medium build-up of the jetting outlet is essentially prevented.

According to further exemplifying embodiments, the measured air flow value can be used for determining whether there is a leakage in the flow path. If the air flow is measured to be considerably higher than anticipated, this is an indication that air enters into the flow path from another location than the regular flow path entrance, i.e. there is an air leakage into the flow path. Such a leakage could arise from a defect in the structure making up the flow path, or from improper assembly of different elements making up the jetting assembly, i.e. that the flow path interfaces between the different elements are not properly engaged and/or aligned. Also, said improper assembly could be caused by an operator attempting to assemble elements that are not intended for interaction, e.g. for sizing reasons. Regardless of the cause of leakage, a significant rise in the air flow is an indication that the air does not flow in the regular path, and does probably not flow past the jetting outlet. If so, detrimental build-up of viscous medium at the jetting outlet may be imminent, resulting in a reduced jetting performance. Also, if the elements making up the assembly have been incorrectly mounted, then the jetting performance will probably be very poor, if jetting would at all be possible. Thus, upon detection of a significant high air flow level, the jetting operation is preferably prevented.

If, on the other hand, a very low air flow is measured, i.e. an air flow which is considerably below the expected level, or essentially at zero level, then this can in further exemplifying embodiments be used as an indication of a blockage or constriction in the flow path. If there is essentially no flow, this may be due to the operator forgetting to remove a plastic cover provided at the jetting outlet for preventing exposure of the jetting outlet to air during storage and transport, thereby preventing drying out of the viscous medium at the jetting outlet. Thus, if the plastic cover provided for covering the jetting outlet, or at least the entrance to the flow path past the jetting outlet, then essentially no air flow will be detected. If this is the case, jetting operation is preferably prevented since the cover will hinder or at least significantly disturb the jetting of droplets.

In further embodiments of the invention, the measurement of air flow could be used for indicating and distinguishing between occurring and non-occurring jetting operation. During the jetting operation, the jetted droplets will travel through the path of the air flow. Thereby, their presence will have an impact on the air flow, i.e. the air flow will be slightly reduced during the jetting of each droplet. Thus, when the control system has sent a control impulse to the ejector to execute the jetting of droplets, it may be confirmed whether droplets have actually been jetted from the ejector of the jetting apparatus, and passed through the flow path at the jetting outlet, by measuring the variation in the air flow. If the air flow does not provide an indication that jetted droplets has passed through the flow path, then a signal of possible malfunction may be provided to the control system and, optionally, to the operator.

In yet further embodiments, temporary variations in the air flow may be an indication of temporary obstructions in the flow path due to clogging of the flow path conduits or build-up at the jetting outlet. This can also be due to an overload of the flow path capacity. Regardless of which, the temporary variation may lead to a temporary reduction in the jetting performance, e.g. the accuracy in the positioning and volume of jetted droplets. Thus, such variations can be detected and acted upon immediately by the control system, e.g. for adjusting jetting parameters, for pausing the jetting operation such that the temporary overload of the flow path is alleviated, for stopping jetting operation, or for alerting an operator. In particular embodiments, the information regarding temporary variations in the air flow may be stored, together with information of the substrates that were being provided with the jetted droplets when the temporary decrease in air flow occurred, and later used during inspection of these substrates for particularly directing the inspection to areas where there is an increased suspicion of errors or inaccuracies.

Also, in further embodiments, the degree of reduced air flow can be used for indicating the performance of the jetting operation, i.e. the condition of the ejector. If a situation arises where the presence of satellites during jetting operation increases, then more viscous medium particles will be present in the air flow which may lead to a slight reduction of the air flow. The presence of satellites may be due to several different reasons, such as the quality of the viscous medium, e.g. solder paste, the degree of wear of the ejector, imperfections in the control of the jetting operation, etc. Therefore, measurement of air flow may be used as an indication of any of these parameters. In some instances, the jetting parameters may be adjusted for optimization of the jetting operation, resulting in a corresponding increase in the air flow. In other instances, the information of reduced air flow may be used for indicating errors in the viscous medium or the ejector, resulting in the stopping of the jetting operation and exchange of the viscous medium container and/or ejector. The measurement of air flow could in this context also be used for indicating the remaining useful life of the ejector.

According to still further embodiments, the ejector comprises a wall or plate provided with an opening or orifice, located in the jetting path concentric with the jetting outlet, which acts as the start of the flow path and the entrance point for the flow of air for transporting viscous medium residue. Due to the concentricity with the jetting outlet, the jetted droplets are jetted through the orifice. An advantage of this embodiment is that a laminar flow can be provided around the jetted droplets, which has a stabilising effect on the trajectory of the jetted droplets. Furthermore, in this embodiment, the jetted droplets will face a strong head wind immediately following the jetting thereof. Thereby, droplets having a jetting trajectory that deviates angularly from that intended, will encounter a slight side wind. The effect of the side wind on a jetted droplet will be dependent of the magnitude of the angular deviation. As a consequence, the angular deviation can be enhanced to such an extent that the jetted droplet will be collected by the wall providing the orifice.

Moreover, any satellites produced will, in the same manner as described above, due to their angular deviation, encounter a side wind that enhances their angular deviation such that they may be collected by the wall. Due to the lower velocity and significantly smaller volume of the satellites, as compared to the viscous medium droplets, the satellites will be much more susceptible to the effects of the side wind. As understood by the man skilled in the art, the air flow may be provided such that any viscous medium, e.g. jetted droplets or satellites, collected by the wall is removed therefrom and transported away by the air flow.

Also, as stated above, the provision of a maintained, strong air flow provides the laminar flow stabilizing the jetting trajectory and reduces the occurrence of satellites. Thus, by monitoring the air flow, an increased risk of satellite formation and reduction in the stabilizing effect of the laminar flow can be detected.

It should be noted that the above presented embodiments may be used in any suitable combination. Thus, by measuring the air flow, several or all of the above status indications may be used in controlling and performing the operation of jetting droplets onto a substrate.

According to embodiments of the invention, the receptacle may be a stand alone unit, an aggregate unit with the viscous medium container, e.g. a solder paste tube, an aggregate unit with the ejector, or an aggregate unit with the ejector and the solder paste unit. Thus, by determining that the receptacle is empty and unused, a determination may simultaneously be made that the container is new or unused, and/or that the ejector is new or unused. Thus, by measuring the air flow, determinations relating to the ejector and/or the container may also be made.

The features that characterize the invention, both as to organization and to method of operation, together with further objects and advantages thereof, will be better understood from the following description used in conjunction with the accompanying drawings. It is to be expressly understood that the drawings is for the purpose of illustration and description and is not intended as a definition of the limits of the invention. These and other objects attained, and advantages offered, by the present invention will become more fully apparent as the description that now follows is read in conjunction with the accompanying drawings.

DESCRIPTION OF EXEMPLARY EMBODIMENT

Figure 1:
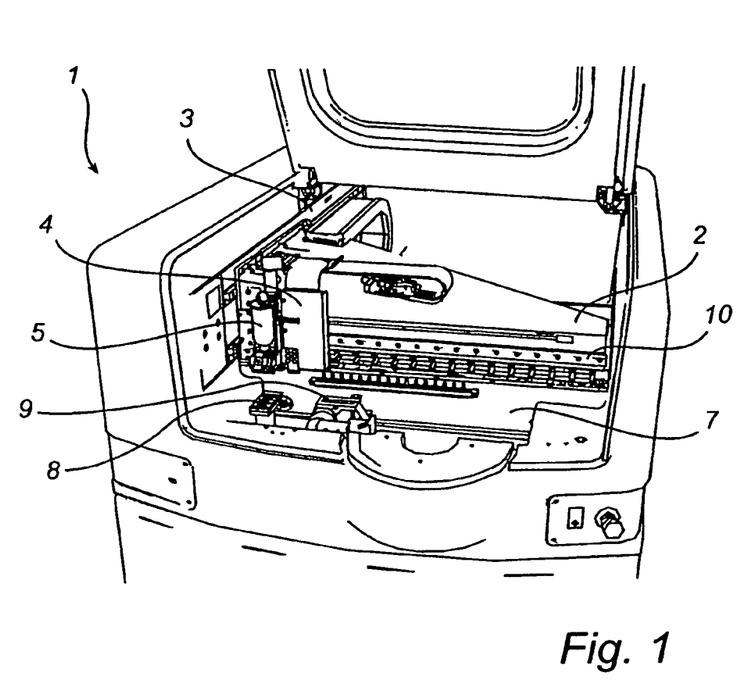
FIG. 1 is a perspective view showing the general outline of a apparatus for application of solder paste according to embodiments of the present invention.

FIG. 1 illustrates the general outline of a preferred embodiment of an apparatus 1 for providing a substrate (not shown) with deposits by dispensing droplets of a viscous medium onto the substrate, i.e. jetting, in accordance with the present invention. For ease of description, the viscous medium will hereinafter be referred to as solder paste, which is one of the alternatives defined above. For the same reason, the substrate will be referred to as an electric circuit board and the gas will be referred to as air. In this embodiment, the jetting apparatus 1 is of a type comprising an X-beam 2 and an X-wagon 4, which is connected to the X-beam 2 via an X-rail 10 and is movable in a reciprocating way along the X-rail 10. The X-beam 2, in turn, is movably connected to a Y-rail 3, the X-wagon 3 thereby being movable along the Y-rail 3. The Y-rail 2 is rigidly mounted in the jetting apparatus 1. Generally, the movements are provided by linear motors (not shown).

Furthermore, the jetting apparatus 1 comprises an internal conveyor 7 for carrying the board through the jetting apparatus 1, and a locking device for locking the board when jetting is to take place.

A docking device is attached to the X-wagon 4 for enabling releasable mounting of an assembly 5 at the docking device. The assembly 5 is arranged for dispensing droplets of solder paste, i.e. jetting, which impact and form deposits on the board. The jetting apparatus 1 also comprises at least one vision device, e.g. a camera. The camera is used for determining the position and rotation of the substrate or board and for checking the result of the dispensing process by viewing the deposits on the board. Furthermore, a cassette calibration unit 9 and a camera calibration unit 8 are provided for calibration of the jetting apparatus.

Additionally, the jetting apparatus 1 comprises a vacuum ejector 6 (schematically shown in FIG. 5) arranged on the X-wagon 4, and a source of compressed air (not shown). The vacuum ejector, as well as the source of compressed air, is in communication with the docking device via air conduit interfaces which are connectable to complementary air conduit interfaces of the docking device.

As readily understood by those skilled in the art, the jetting apparatus also comprises a processor or control unit 80 (schematically shown in FIG. 5) for executing software running the apparatus.

Briefly, the jetting apparatus works as follows. The board is fed into the jetting apparatus 1 by means of the conveyor 7, upon which the board is placed. When the board is in the correct position under the X-wagon 4, the board is fixed with the aid of the locking device. By means of the camera, fiducial markers are located, which markers are prearranged on the surface of the board and used to determine the precise position thereof. Then, by moving the X-wagon over the board in a predetermined (pre-programmed) pattern and operating the jetting assembly 5 at predefined locations, solder paste is applied on the board at the desired locations.

Figure 2A:
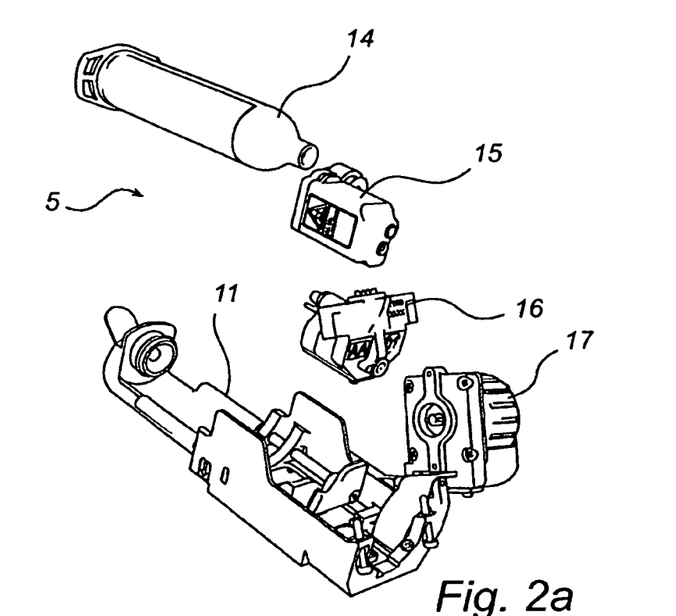
FIGS. 2a and 2b are perspective views of an embodiment of a jetting assembly shown in both separated and assembled state.
Figure 2B:
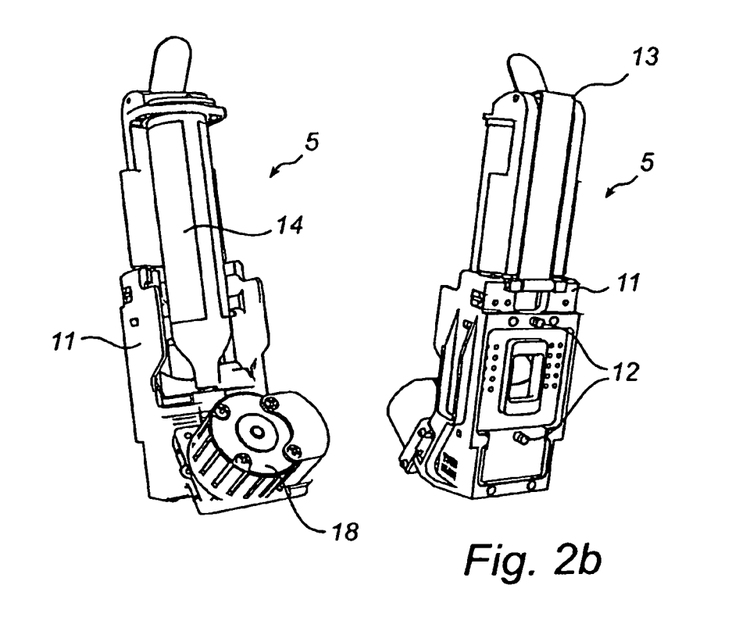
Figure 3:
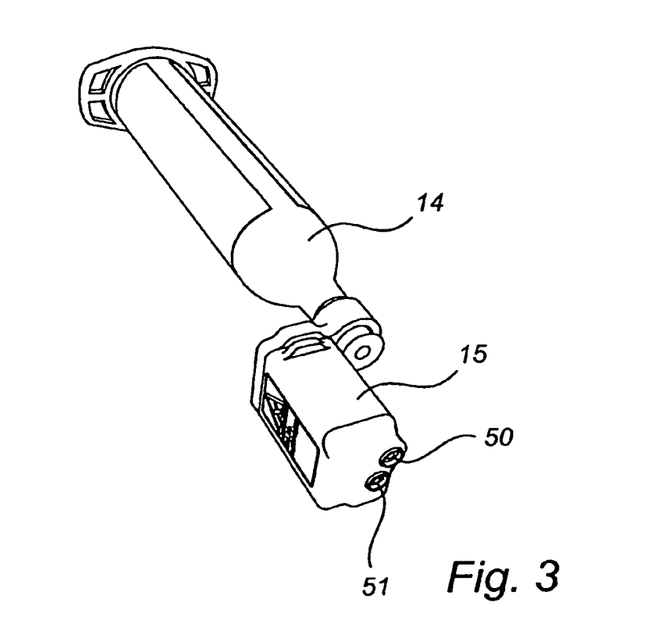
FIG. 3 is a perspective view of an aggregated viscous medium container and viscous medium receptacle.
Figure 4:
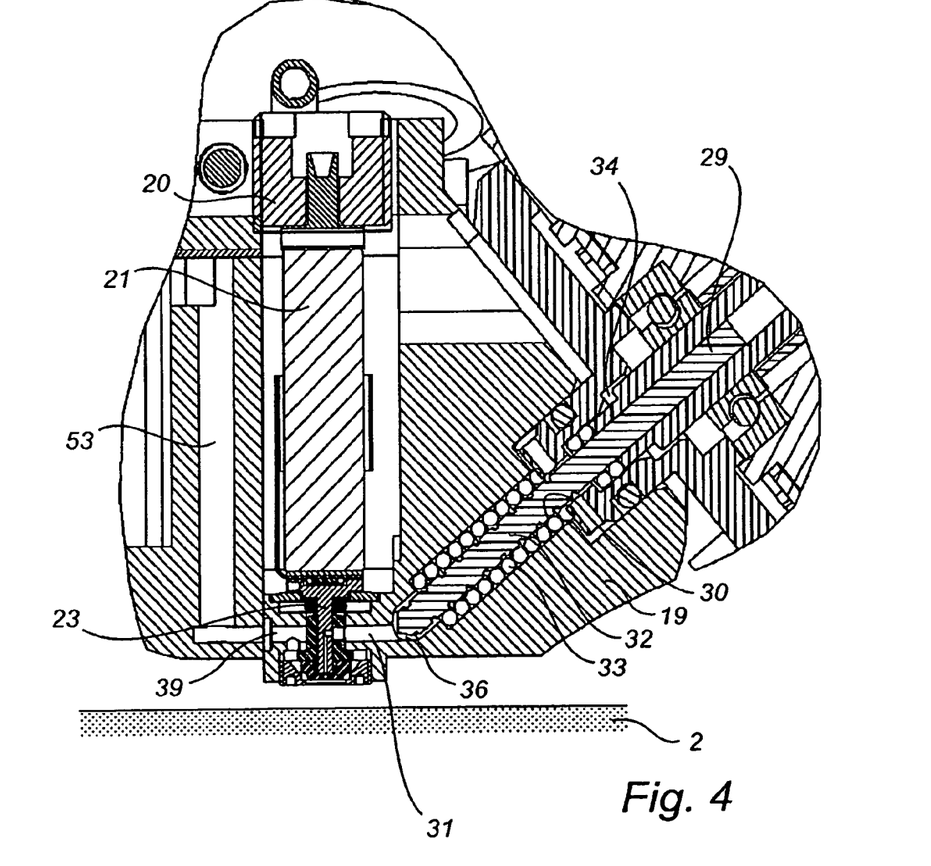
FIG. 4 is a sectional view of an embodiment of a jetting assembly showing a portion of an ejector and a receptacle according to embodiments of the invention.

With reference to FIGS. 2a, 2b and 3, an exemplifying embodiment of a jetting assembly 5 will now be described in more detail. In FIG. 2, the assembly 5 is illustrated in an exploded view showing its separate elements, as well as when assembled in the form of an aggregate unit. The jetting assembly 5 comprises an assembly holder 11 having holding elements 12 for connecting the jetting assembly 5 to an assembly support of the docking device, as well as a holding element 13 for securing the assembly of the aggregate unit 5. Furthermore, in this embodiment, the jetting assembly 5 comprises a viscous medium container 14 providing a supply of solder paste, and a viscous medium receptacle 15 for receiving viscous medium residue produced during the jetting operation. The jetting assembly 5 is connected to the vacuum ejector 6 and the source of pressurised air via a pneumatic interface 50, which will be further illustrated below. Furthermore, the assembly 5 comprises a jetting device or ejector 16, as well as a motor unit 17 provided for driving the feeding, i.e. a rotatable feed screw 32, of viscous medium into an eject chamber 28 of the jetting device 16. In this embodiment, the motor unit 17 is pivotally mounted to the holder 11, such that the motor unit may be folded away for providing easy assembly of the assembly elements, which is illustrated in the exploded view of FIG. 2.

Also, in FIG. 3, the container 14 and the receptacle 15 are shown as an aggregate unit separate from the ejector 16, the motor unit 17 and the holder 11. In this embodiment, the container 14 and receptacle 15 are assembled prior to mounting them into the holder 11 for forming the assembly 5. Preferably, the receptacle 15 and the container 14 are delivered to the manufacturing site as an already assembled unit, to be mounted with the holder 11, ejector 16 and motor unit 17 to form the assembly 5 for performing the jetting operation.

With further reference to FIGS. 4-7, the contents and function of the device enclosed in the jetting assembly 5 will be explained in greater detail. As can be seen in these sectional views, the jetting assembly 5 includes an ejector or jetting device 16 comprising an actuator locking screw 20 for supporting an actuator, and a piezoelectric actuator 21 formed by a number of thin, piezoelectric elements stacked together to form the actuator 21, which is rigidly connected to the locking screw 20. The jetting device 16 further comprises a bushing 25 rigidly connected to a housing 19, and a plunger 23 rigidly connected to the end of the piezoelectric actuator 21, opposite the position of the locking screw 20. The plunger 23 is axially and slidably movable while extending through a bore in the bushing 25. Cup springs 24 are provided to resiliently balance the plunger 23 against the housing 19, and for providing a preload for the actuator 21. An eject control unit (not shown) applies a drive voltage intermittently to the piezoelectric actuator 21, thereby causing an intermittent extension thereof and hence a reciprocating movement of the plunger with respect to the housing 19, in accordance with solder pattern printing data.

Further, the jetting device comprises an eject nozzle 26 operatively directed against the board 2, onto which small droplets of solder paste are to be jetted. In the nozzle 26, there is comprised a jetting orifice 27 through which the droplets are jetted. The surfaces of the nozzle 26 surrounding the jetting orifice 27 and facing the substrate 2 will be referred to as a jetting outlet. The plunger 23 comprises a piston portion which is slidably and axially movably extending through a piston bore 35, an end surface of said piston portion of the plunger 23 being arranged close to said nozzle 26. An eject chamber 28 is defined by the shape of the end surface of said plunger 23, the inner diameter of the bushing 25 and the nozzle orifice 27. Axial movement of the plunger 23 towards the nozzle 26, said movement being caused by the intermittent extension of the piezoelectric actuator 21, will cause a rapid decrease in the volume of the eject chamber 28 and thus a rapid pressurisation and jetting through the nozzle orifice 27, of any solder paste contained in the eject chamber 28.

Solder paste is supplied to the chamber from the supply container 14, see FIG. 2, via a feeding device. The feeding device comprises an electric motor, arranged in the motor unit 17, having a motor shaft 29 partly provided in a tubular bore 30, which extends through the housing 19 to an outlet 36 communicating via a tubular bore 31 with said piston bore 35. An end portion of the motor shaft 29 forms a rotatable feed screw 32 which is provided in, and coaxial with, the tubular bore 30. An essential portion of the rotatable feed screw 32 is surrounded by an array of resilient, elastomeric o-rings 33 arranged coaxially therewith in the tubular bore 30, the threads of the rotatable feed screw 32 making sliding contact with the innermost surface of the o-rings 33.

The pressurised air obtained from the above-mentioned source of pressurised air (not shown) is arranged to apply a pressure on the solder paste contained in the supply container 12, thereby feeding said solder paste to an inlet port 34 communicating with the tubular bore 30. An electronic control signal provided by a supply control unit (not shown) to the motor causes the motor shaft 29, and thus the rotatable feed screw 32, to rotate a desired angle, or at a desired rotational speed. Solder paste captured between the threads of the rotatable feed screw 32 and the inner surface of the o-rings 33 are then made to travel from the inlet port 34 to the piston bore 35 via the outlet port 36 and the tubular bore 31, in accordance with the rotational movement of the motor shaft 29. A sealing o-ring 22 is provided at the top of the piston bore 35 and the bushing 25, such that any solder paste fed towards the piston bore 35 is prevented from escaping from the piston bore 35 and possibly disturbing the action of the plunger 23.

The solder paste is then fed into the eject chamber 28 from an outlet port 36 of the tubular bore 30 via the conduit 31 and a channel 37. The channel 37 is provided in the piston portion of the plunger 23, wherein said channel 37 has a first portion extending axially into said plunger and communicating with the conduit 31, and a second portion extending coaxially with and within said plunger 23 from said first portion to the end surface of the plunger facing the eject chamber 28.

Figure 6:
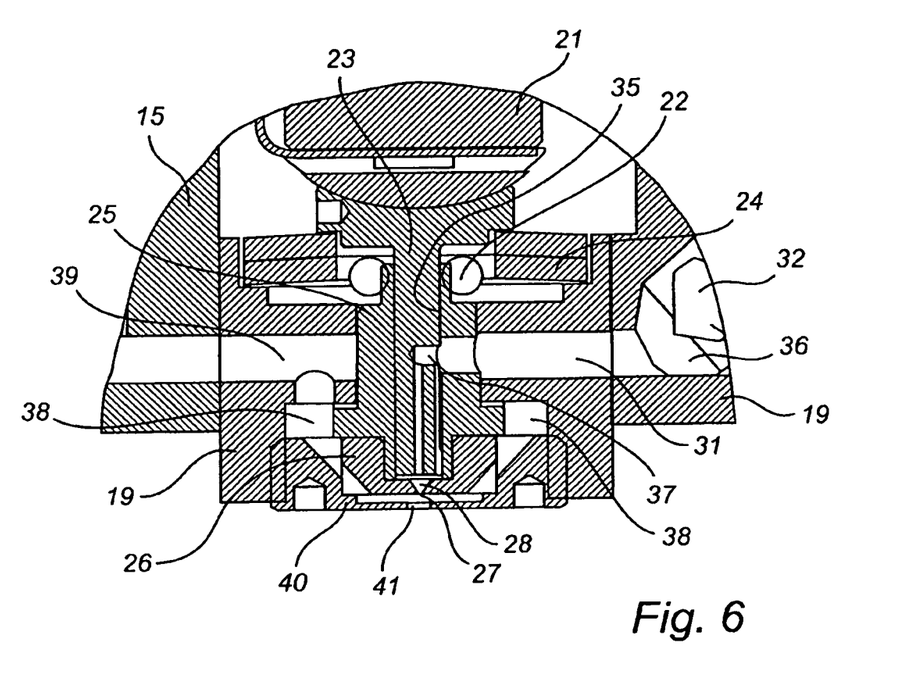
FIG. 6 is an enlarged sectional view of the embodiment of FIG. 4 showing a portion thereof in greater detail.
Figure 7:
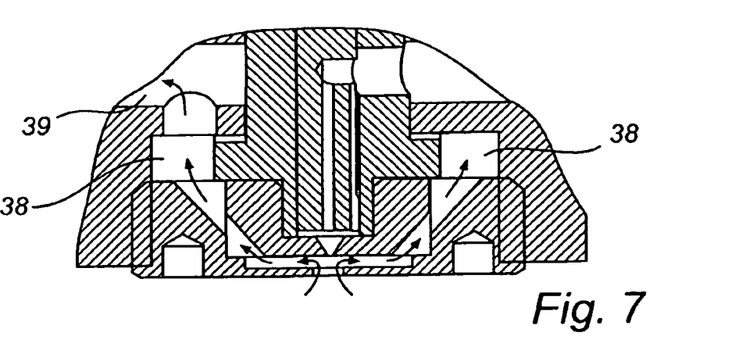
FIG. 7 is an enlarged sectional view illustrating the flow path at the jetting outlet of the embodiment shown in FIG. 4.

As can most clearly be seen in FIG. 6, the jetting device 15 of the jetting assembly 5 comprises a support plate 40 located below or downstream of the nozzle orifice 27, as seen in the jetting direction. The support plate 40 is provided with a through hole 41, through which the jetted droplets may pass without being hindered or negatively affected by the support plate 40. Consequently, the hole 41 is concentric with the nozzle orifice 27.

According to this embodiment, the ejector 16 comprises an air flow passage 38 consisting of a first portion defined by the nozzle orifice 27, the nozzle 26 and the support plate 40, said first portion defining a disc shaped space concentric with the piston bore 35; a second portion defined by the nozzle 26 and the support plate 40, connected to said first portion and extending coaxially about the nozzle 26; and a third portion defined by the housing 19 and the bushing 25, connected to the second portion, parallel with the piston bore 35 and extending coaxially around the part of the bushing 25 facing said third portion. The air flow passage 38 is further in communication with an air flow conduit 39 located on the side of the piston bore 35 opposite that of the tubular bore 31. The air flow conduit 39 extends from the third portion of the air flow passage 38 and the viscous medium waste container or receptacle 15.

Thus, when the assembly 5 is assembled, the receptacle 15 for collecting fragments of residue solder paste will be connected to the ejector 16. The receptacle 15 can be best seen in FIG. 5, where it is schematically shown in its entirety. The receptacle 15 is connected to the ejector 16 at an interface provided on the ejector 16, via a corresponding interface 50 arranged on the receptacle 15. The receptacle 15, which will be described in more detail below, also provides an interface 51 and communication between the jetting assembly 5 and the vacuum ejector 6. Thereby, the negative pressure or vacuum produced by the vacuum ejector is conveyed to the ejector 5, and to the communicating air flow conduit 39 and airflow passage 38.

Figure 5:
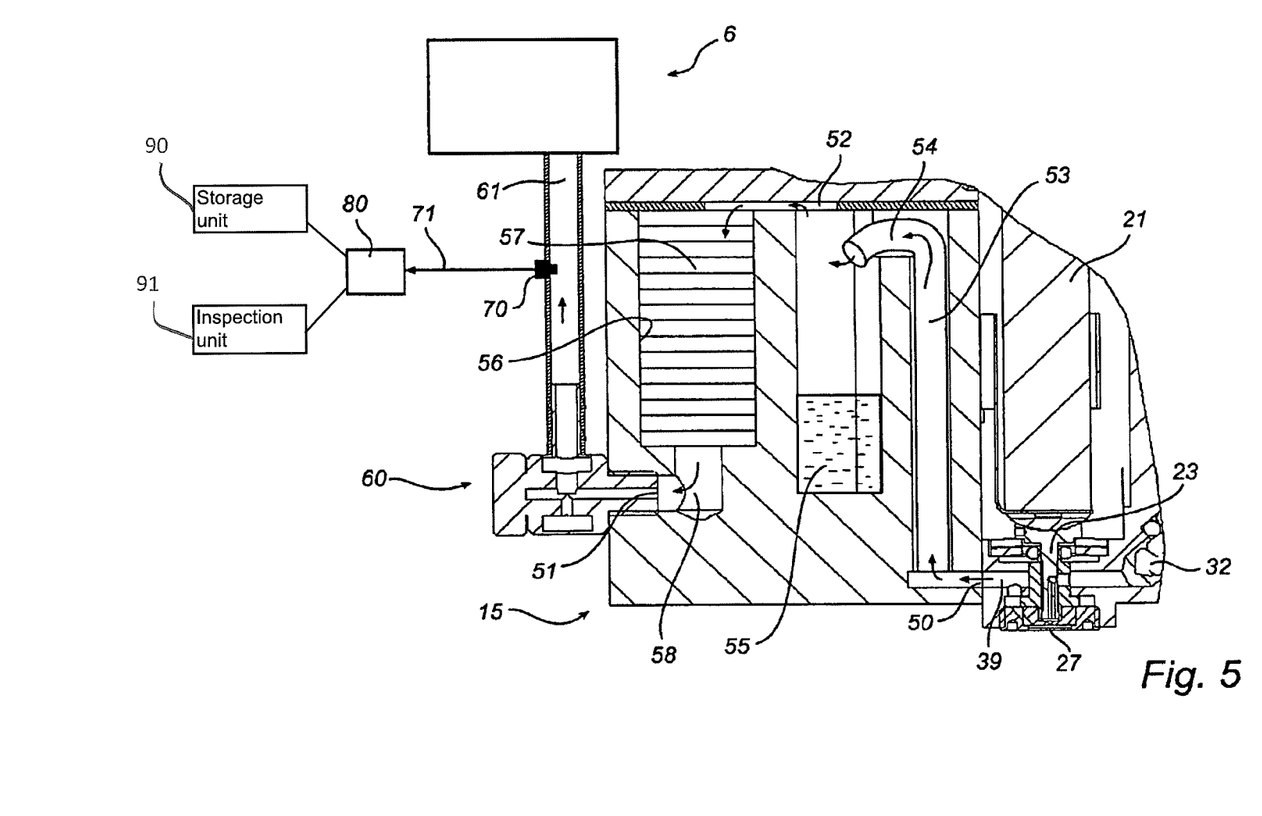
FIG. 5 is an alternative sectional view of the embodiment shown in FIG. 4.

The receptacle 15 comprises an air conduit 53, forming an air flow path or channel within the receptacle 15. The air conduit 53 has a first portion communicating with said connecting interface 50 and is aligned with the air flow conduit 39 of the jetting assembly, and a second portion extending perpendicularly from said first portion. At the end thereof, the air conduit 53 takes the form of a guiding tubing which is in communication with a collection chamber 55, arranged for collection of solder paste residue removed from the jetting outlet. Preferably, the conduit 53 has an outlet 54 that is directed downwards, thus guiding the carried solder paste towards the bottom of the chamber. At the top of the collection chamber 55, a narrow air conduit 52 leads the air flow out of the collection chamber 55. Thereby, the air will flow from the outlet 54 of the conduit 53 and deflect into the air conduit 52 at the top of the collection chamber, while the main portion of the solder paste residue will be released, due to the momentum thereof and gravity, from the air stream and fall into the collection chamber.

Even if the majority of collected solder paste residue carried by the air flow is released and collected in the collection chamber, a small portion thereof may still be carried onwards by the air flow. Therefore, the receptacle further comprises a filter 57, into which said narrow air conduit guides the flow of air. The filter 57 is of conventional type and provided for preventing any fragments of solder paste not collected in the collection chamber 55 from reaching the vacuum ejector. The filter is arranged in a longitudinal bore 56 and is in communication with an outlet conduit 58, in communication with the outlet interface 51 provided for interface with the vacuum ejector 6.

The receptacle 15 is releasably connected to the vacuum ejector 6, of conventional type, which is arranged for evacuating the receptacle 15. The vacuum ejector 6 is connected to the receptacle 15 via the air outlet 58, a connector 60 and an air tube 61. Even though the vacuum ejector is illustrated as being separate from the solder paste ejector 16 and/or the receptacle 15, a number of other placements or combinations of the vacuum ejector 6, the ejector 16, and the receptacle 15 are of course conceivable within the scope of the present invention. However, the vacuum ejector 6, the connector 61 and the air tube 61 are preferably arranged in the jetting machine 1, i.e. separate from the elements making up the jetting assembly 5.

Furthermore, a flow sensor 70 is arranged and positioned in the air tube 61. The flow sensor is arranged for measuring the air flow in the air flow path of the jetting apparatus, i.e. including the air flow conduit 39 and air flow passage 38 of the ejector; the conduit 53, the collection space 55, the narrow air conduit 52, the filter 57, and the outlet conduit 58 of the receptacle 15; as well as the connector 60 and the air tube 61. Use can be made of any available flow meter suitable for the particular flow range and having a suitable size for positioning and measuring in the flow path of the air tube 61, for instance the MEMS Mass Flow Sensor provided by Omron Electronic Components Europe B.V.

The flow sensor 70 is electronically connected to he control unit 80, which is also arranged for receiving and evaluating the measurement signal 71 output by the flow sensor.

In operation, the vacuum ejector 6 evacuates the waste container 15, including evacuation of the air conduit 53, the collection space 55, the narrow air conduit 52, the filter 57, the outlet conduit 58, the connector 60 and the air tube 61. This evacuation produces an air flow through the waste container as indicated by the arrows in FIG. 5. As a consequence, air flow conduit 39 and air flow passage 38 of the ejector 16 are also evacuated via their interface. Thus, air is sucked in through the outlet hole 41, which gives rise to a strong air flow in a direction reverse to that of the jetted droplets. This air flow will pass the jetting outlet and remove any undesired residue of solder paste that may have become adhered to the jetting outlet, for reasons described above.

According to the preferred embodiments, the air flow is continuously provided before, during and after the jetting of each droplet. Also, the air flow could be provided intermittently, following a predetermined time period of jetting, or following a predetermined number of jetted droplets. It is also contemplated that the accumulation or build-up of solder paste residue at the jetting outlet is monitored, and that the flow of air is provided when the accumulation reaches a certain level. However, it is preferred that the air flow is constantly provided during the jetting process.

Thus, the air will flow through the air flow passage 38 and continue into the receptacle 15 via the air flow conduit 39. Due to the force of the air flow, solder paste fragments removed from the vicinity of the jetting outlet will be transported or carried through the air flow passage 38, the air flow conduit 39 and into the receptacle 15. Inside the receptacle 15, the air will flow through the air conduit 53 and into the collection chamber 55. Due to the force of gravity, the majority of the solder paste residue transported by the air flow will fall into the collection chamber 55, while the air flow will continue into the narrow conduit 52. Any residue of solder paste that may continue along with the air flow into the narrow conduit 52, will be collected by the filter 57, thus preventing fragments of solder paste from reaching the outlet conduit 58.

Furthermore, as the jetted droplets face a strong head wind immediately following the jetting thereof, any droplets having a jetting trajectory with an angular deviation from that intended, will encounter a slight side wind. The effect of the side wind on a jetted droplet will be dependent of the magnitude of angular deviation. As a consequence, the angular deviation can be enhanced to such an extent that the jetted droplet will "miss" the hole 41 and instead be collected by the support plate 40. The above may also be the case for any satellites, described above, which due to their angular deviation will encounter a side wind and be collected by the support plate 40. Then, the air flow present or later produced in the air flow passage will transport away any solder paste collected by the support plate 40. Due to the lower velocity and significantly smaller volume of the satellites, as compared to the solder paste droplets, the satellites will be much more prone to be affected by the side wind.

In further embodiments, the jetting apparatus may further comprise a storage unit (e.g., storage unit 90 illustrated in FIG. 5) for storing the air flow signal for providing air flow information of the jetting operation related to a particular substrate or group of substrates, and an inspection unit (e.g., inspection unit 91 illustrated in FIG. 5) arranged for inspecting the results of the jetting operation related to a particular substrate or group of substrates utilizing the air flow information for indicating when and for which droplets(s) there is an increased probability of reduced jetting performance due to air flow variation.

Figure 8:
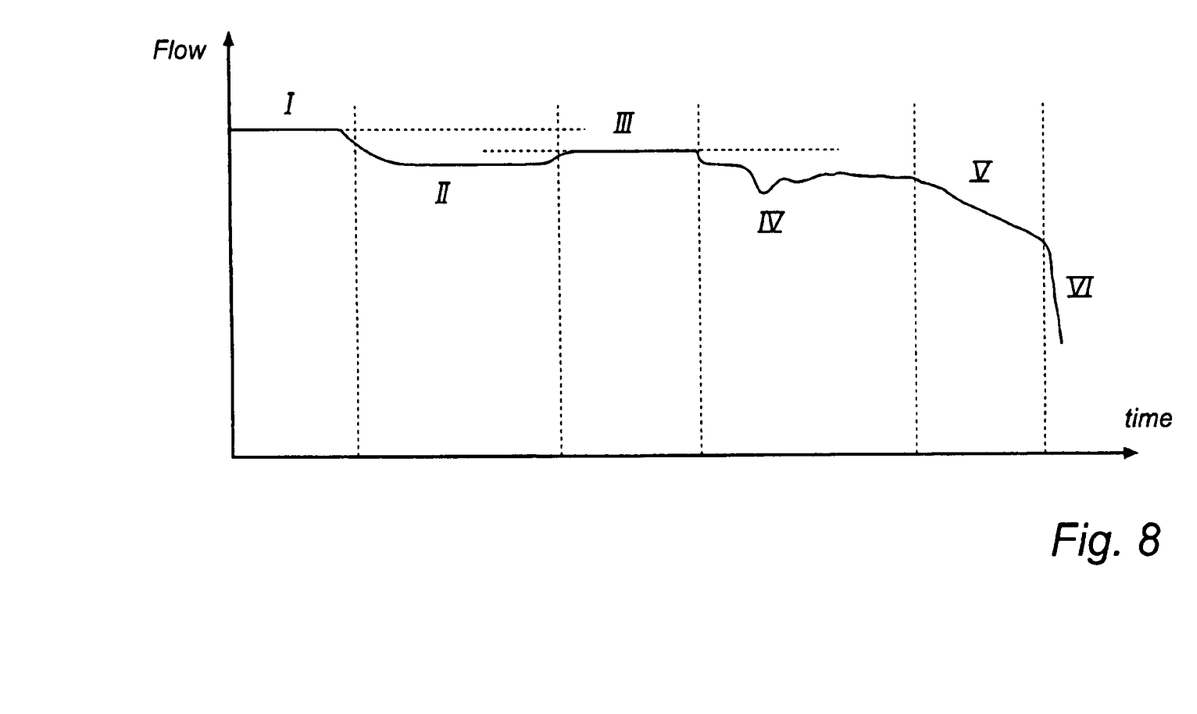
FIG. 8 is a diagram schematically illustrating the result of air flow measurements at different status conditions according to embodiments of the present invention.

With reference now to FIG. 8, there is shown a diagram schematically illustrating results of air flow measurements at different status conditions of the jetting apparatus. First, the measurement of a regular air flow for a new or unused, correctly assembled jetting assembly is illustrated at "I". Even though the actual measurement value will differ slightly between different individual assemblies, the first measurement of air flow may be compared to selected threshold values for indicating a malfunction in the jetting assembly. Thus, an extremely low or absent air flow may indicate that the flow path is blocked, probably due to the transport cover strip covering the flow path entrance not having been removed. Furthermore, an extremely high air flow may indicate improper mounting of the jetting assembly or a defect in the form of a leak.

At "II", the air flow during the jetting operation is illustrated. Since the jetted droplets will pass through the flow path, a slight reduction in the air flow may be detected. Thus, this may be used as a confirmation to the control system that a control impulse to the ejector for jetting of a droplet or a series of droplets has resulted in the droplet or series of droplets actually being jetted.

At "III", there is illustrated the air flow for a used jetting assembly when there is no occurring jetting operation. Here, a certain amount of viscous medium residue has been picked-up from the jetting outlet or the jetting trajectory and transported away to the receptacle. Thus, the air flow is increased in relation to the air flow during occurring jetting, but reduced in relation to the air flow for the unused assembly. The reason is of course that viscous medium residue is present in the flow path, at least in the collection chamber and filter of the receptacle.

At "IV", jetting has once again commenced with the now used jetting assembly. Here, it can be seen that the measured air flow is not as stable as in period "II". This may be an indication that the jetting operation is not running as perfectly as in the previous period. For instance, the dip in the curve represents a temporary decrease in the air flow. This could for instance indicate a temporary obstruction or congestion in the flow path, or that the jetting process suddenly has become more inaccurate and produces more satellites which will reduce the air flow. Even though the dip is not significant enough to warrant a stop of the jetting operation or even alerting an operator, the information of the temporary reduction in air flow may be stored, together with information of on which substrate and where on the substrate the droplets were deposited, and later used for identifying areas on the particular substrate(s) that require extra attention during inspection.

At "V", the receptacle is starting to fill up, i.e. the filter is getting more and more clogged and/or the collection chamber is filling up. This can be detected as a clear and continuous reduction of the air flow. The reduction rate may be used for determining the remaining useful life of the jetting assembly or receptacle, since the rate of air flow reduction will increase with increased filling ratio.

This is further illustrated at "VI", where the filling ratio has reach a level where the filling rate is high and the air flow correspondingly reduces very rapidly. At this stage of operation, the jetting operation is preferably shut off such in order to maintain a high quality of the jetting results.

The preceding specific embodiments are illustrative of the practice of the invention. It is to be understood, therefore, that other expedients known to those of skill in the art or disclosed herein may be employed without departing from the invention as defined by the appended claims. It is therefore understood that the invention may be practiced otherwise than is specifically described without departing from the scope of the present invention.

We claim:

1. A jetting apparatus for jetting individual droplets of viscous medium onto a substrate, comprising:
   a jetting device having a jetting outlet through which said droplets are jetted,
   a vacuum ejector configured to produce a negative pressure for producing a flow of air past the jetting outlet for removing viscous medium residue at the jetting outlet,
   a receptacle for receiving viscous medium residue transported by said air flow away from the jetting outlet,
   an air flow path for said air flow between said jetting outlet and said vacuum ejector, via said receptacle,
   an air flow meter for measuring the air flow in said air flow path, said air flow meter including a flow sensor positioned in the air flow path between said jetting outlet and said vacuum ejector, said air flow meter being arranged for outputting an air flow signal representative of the air flow in the air flow path, and a processor arranged for receiving said flow signal from the air flow meter, evaluating said flow signal, and outputting an indication of a status of the jetting apparatus.

2. The jetting apparatus as claimed in claim 1, wherein the processor is configured and arranged to compare the said air flow signal to one or more threshold values, each threshold value being representative of at least one status of said jetting apparatus.

3. The jetting apparatus as claimed in claim 1, wherein the processor is configured and arranged to monitor the variation in said air flow, and to compare said variation to chosen threshold values indicating at least one status of the jetting apparatus.

4. The jetting apparatus as claimed claim 1, wherein the processor is configured and arranged to evaluate said air flow signal to output an indication of a status of air flow leakage.

5. The jetting apparatus as claimed in claim 1, wherein the processor is configured and arranged to evaluate said air flow signal to output an indication of a status of occurring or non-occurring jetting operation.

6. The jetting apparatus as claimed in claim 1, wherein the processor is configured and arranged to evaluate said air flow signal to output an indication of a status of a certain filling ratio of the receptacle.

7. The jetting apparatus as claimed in claim 1, further comprising a viscous medium filter arranged in the receptacle, wherein the flow of air is guided through the filter within the receptacle, wherein the processor is configured and arranged to evaluate said air flow signal to output an indication of a status of a certain clogging degree of said filter.

8. The jetting apparatus as claimed in claim 1, wherein the processor is configured and arranged to evaluate, in said step of evaluating, said air flow signal to indicate a status of obstructed air flow, and to output an indication that the air flow is so low that the accuracy of the jetting operation may be affected.

9. The jetting apparatus of claim 8, wherein said obstructed air flow is a result of at least one of the receptacle being substantially full with viscous medium, and a filter of the receptacle being substantially clogged with viscous medium.

10. The jetting apparatus as claimed in claim 1, wherein the processor is configured and arranged to evaluate said air flow signal to output an indication of a status of temporary minor obstruction of the air flow.

11. The jetting apparatus as claimed in claim 1, wherein the processor is configured and arranged to evaluate said air flow signal during occurring jetting operation to output an indication of a status related to an amount of generated viscous medium residue per time period.

12. The jetting apparatus as claimed in claim 11, wherein said status related to the amount of generated viscous medium residue per time period represents the performance of the jetting operation.

13. The jetting apparatus as claimed in claim 1, wherein the processor is configured and arranged to prevent the jetting of viscous medium when the evaluation of air flow and indication of status of said jetting apparatus indicates that the performance of the jetting operation may be in jeopardy.

14. The jetting apparatus as claimed in claim 13, wherein said processor is configured and arranged to prevent the jetting when said status indicates the possibility of at least one of a leakage in the flow path and an erroneous assembly of the jetting apparatus.

15. The jetting apparatus as claimed in claim 13, wherein said processor is configured and arranged to prevent the jetting when said status indicates that the flow of air is significantly obstructed in said receptacle.

16. The jetting apparatus as claimed in claim 1, further comprising a storage unit configured to store said air flow signal for providing air flow information of the jetting operation related to a particular substrate or group of substrates, and an inspection unit configured to inspect the results of said jetting operation related to a particular substrate or group of substrates utilizing said air flow information for indicating when and for which droplet(s) there is an increased probability of reduced jetting performance due to air flow variation.

17. The jetting apparatus as claimed in claim 1, wherein said processor is configured and arranged to store said air flow signal for providing air flow information of the jetting operation, and to utilize said air flow information for adjusting the jetting operation and improving the performance thereof.

18. The jetting apparatus as claimed in claim 1, wherein the flow sensor is positioned in the air flow path between the flow generator and the receptacle.

* * * * *